United States Patent [19]
Sugi et al.

[11] Patent Number: 5,802,233
[45] Date of Patent: Sep. 1, 1998

[54] POLYSILANE OPTICAL DEVICE

[75] Inventors: Shinichiro Sugi; Keiji Kabeta; Shigeru Wakamatsu; Takafumi Imai, all of Tokyo, Japan

[73] Assignee: Toshiba Silicone Co., Ltd., Tokyo, Japan

[21] Appl. No.: 712,386

[22] Filed: Sep. 11, 1996

[30] Foreign Application Priority Data

Sep. 13, 1995 [JP] Japan .................................. 7-235653

[51] Int. Cl.$^6$ ...................................................... G02B 6/00
[52] U.S. Cl. ...................................... 385/122; 252/514
[58] Field of Search .............................. 385/16, 122, 15, 385/39, 40; 252/512, 514; 528/10, 31, 14, 33, 430, 469, 478; 372/21; 136/263, 249, 250, 261, 258, 260, 262

[56] References Cited

U.S. PATENT DOCUMENTS

| 5,482,656 | 1/1996 | Hiraoka et al. |
| 5,530,956 | 6/1996 | Hiraoka et al. ...................... 385/122 |
| 5,565,041 | 10/1996 | Hiraoka et al. ...................... 136/263 |
| 5,633,312 | 5/1997 | Kabeta et al. ........................ 528/14 |

FOREIGN PATENT DOCUMENTS

A 0510655  4/1992  European Pat. Off. .

*Primary Examiner*—Akm E. Ullah
*Attorney, Agent, or Firm*—Sughrue, Mion, Zinn, Macpeak & Seas, PLLC

[57]  ABSTRACT

A polysilane optical device comprising a hydrocarbyloxy group-containing polysilane encapsulated with a material having a light transmitting property and air impermeability, such as a glass, a polystyrene, an acryl resin, or a polycarbonate. The optical device has a high durability, and optical characteristics and functions thereof do not greatly change.

3 Claims, 2 Drawing Sheets

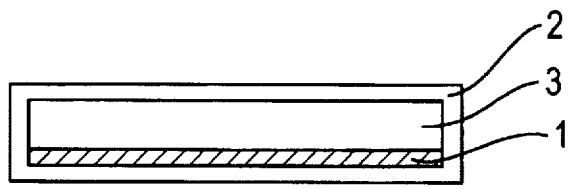
FIG. 1
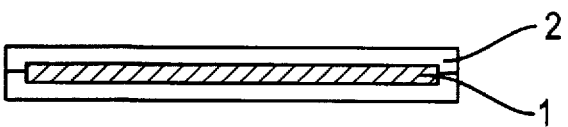
FIG. 2
FIG. 3
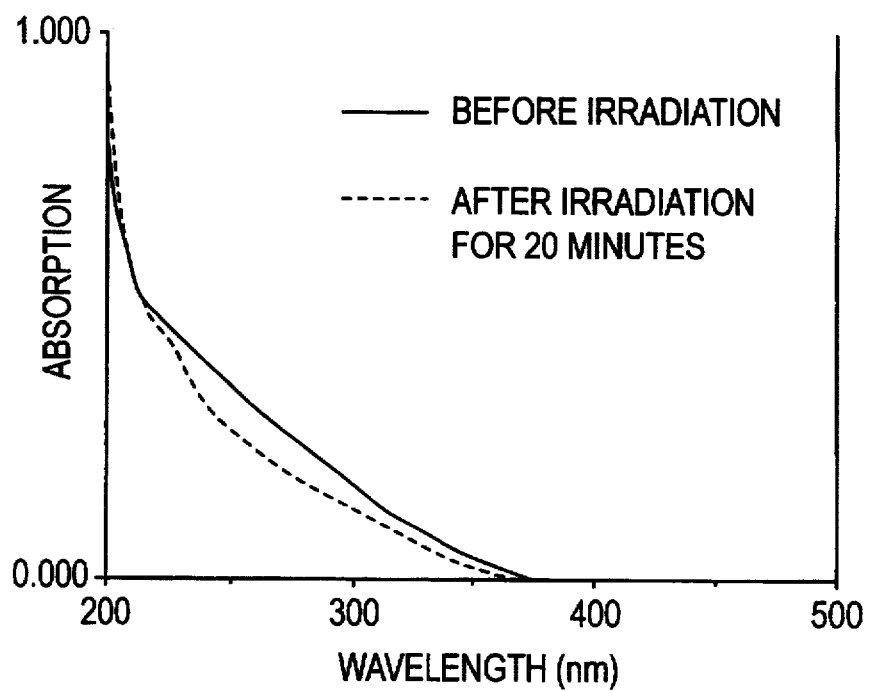

POLYSILANE OPTICAL DEVICE

FIELD OF THE INVENTION

The present invention relates to an optical device, and more specifically to an optical device showing no change of optical characteristics during use thereof and having excellent durability.

BACKGROUND OF THE INVENTION

Organosilicon-based high molecular weight materials such as polysilane are not only utilized as a precursor for silicon carbide but are also expected to be applied to electrically conductive organic materials and photoresist materials, as described in J. Michl et al, *Chemical Review*, 89, 1359(1989). Furthermore, their application to nonlinear optical materials and optical waveguides has been investigated.

Polysilane is normally obtained as a colorless transparent solid. Since an electron of an Si-Si σ bond along the main chain easily moves, polysilane is expected to be third order nonlinear materials. Poly(methylphenylsilane) and poly(methylcyclohexylsilane) have a third order nonlinear optical coefficient ($\chi^3$) of about $10^{-12}$ esu, and this value is the largest level in colorless materials, as described in F. Kajzar et al, *Journal of Applied Physics*, 60, 3040(1986) and J. C. Baumert et al, *Applied Physics Letter*, 53, 1147(1989).

On the other hand, as an optical waveguide, since the Si-Si bond is converted into a Si—O—Si bond, largely changing its refractive index by being exposed to ultraviolet rays in the presence of oxygen, the polymer is expected to be useful as materials for optical waveguides prepared by patterning with irradiation as described in L. A. Hornak et al, *Journal of Applied Physics*, 67, 2235(1990). In this application, to prevent the polymer from becoming a low molecular weight polymer upon cutting the Si-Si bond at a ultraviolet exposure, poly(cyclohexylsilyne), etc., having a network structure is used as a polysilane.

However, in using the polysilane as an optical material, when the polysilane is irradiated with light of a short wavelength such as ultraviolet rays during use, cleavage of the Si-Si bond in the polysilane chain occurs. Thus, polysilane has problem with durability as a material. That is, when a polysilane is used as a nonlinear material, nonlinear optical characteristics of the material decrease by the cleavage of the Si-Si bond. Also, when a polysilane is used as an optical waveguide, its refractive index sometimes changes by the chemical change due to the cleavage of the Si-Si bond, changing the amount of light transmitted, and the molecular weight of the polymer decreases to change the form of the optical waveguide. Such deterioration cannot be completely overcome even by introducing a network structure into the polysilane molecule.

SUMMARY OF THE INVENTION

The present invention has been made to overcome the problems as described above.

Accordingly, an object of the present invention is to provide a polysilane optical device which is industrially useful and has a high durability, wherein its optical characteristics and function are difficult to change when used as an optical device.

As a result of various investigations to attain the object described above, the inventors have found that when a polysilane having a hydrocarbyloxy group such as an alkoxy group is irradiated with ultraviolet rays in the presence of oxygen, optical waveguides can be drawn with ultraviolet rays, and such a polysilane is encapsulated with a light-transmitting material to an oxygen-free state, the basic characteristics of the polysilane do not change even if the polysilane is exposed to light of the ultraviolet range during the use thereof, and also the function of the device does not change by lowering the molecular weight of the polysilane. The present invention has been completed based on this finding.

According to the present invention, there is provided a polysilane optical device comprising a hydrocarbyloxy group-containing polysilane having formed thereon an optical waveguide, said polysilane being encapsulated with a light-transmitting and air impermeable material to be in an oxygen-free state.

BRIEF DESCRIPTION OF THE DRAWINGS

FIG. 1 is a schematic cross sectional view showing an example of the optical device of the present invention;

FIG. 2 is a schematic cross sectional view showing another example of the optical device of the present invention;

FIG. 3 is a graph showing the ultraviolet absorption spectra of the polysilane in Example 1 before and after irradiation.

DETAILED DESCRIPTION OF THE INVENTION

Figure 4:
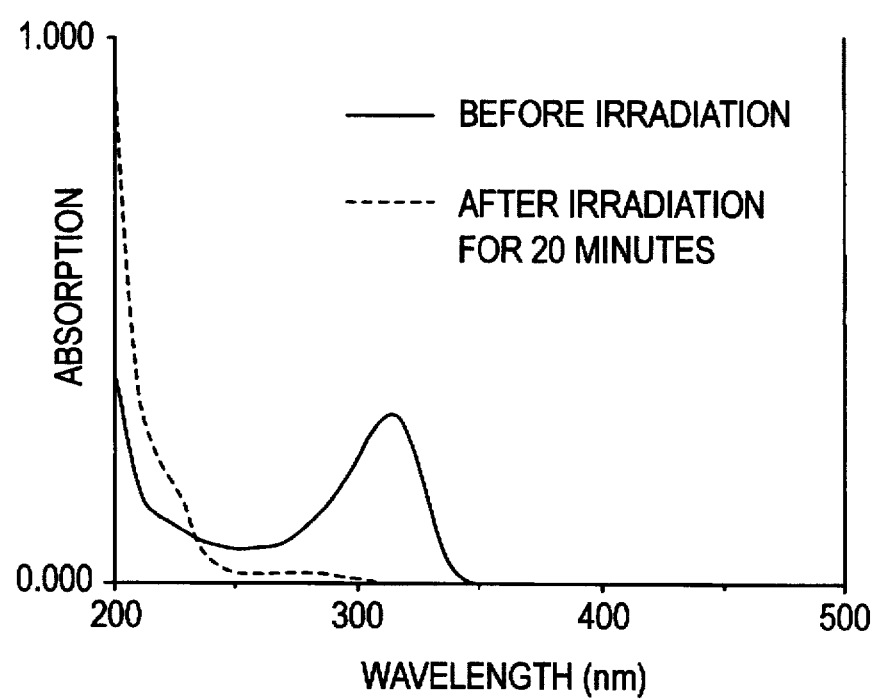
FIG. 4 is a graph showing the ultraviolet absorption spectra of the polysilane in Comparative Example 1 before and after irradiation.

The present invention is described in detail below.

The hydrocarbyloxy group-containing polysilane used in the present invention is preferably represented by the following average formula (I):

wherein $R^1$s, which may be the same or different, each represent a substituted or unsubstituted monovalent hydrocarbon group bonded to silicon atom; $R^2$ represents a mono-valent hydrocarbon group having from 1 to 12 carbon atoms bonded to silicon atom via oxygen atom; $R^3$ represents a substituted or unsubstituted divalent hydrocarbon group or a substituted or unsubstituted heterocyclic group, bonded to two silicon atoms; a and c each represent 0 or a positive number, b represents a positive number but b/(a+b)≧0.05 and n≧5c; and n is a number selected such that the weight average molecular weight of the polysilane is from 500 to 3,000,000.

Such a polysilane may have a polysilane skeleton of a linear form, a branched form, a cyclic form, or a network form. In this structure, $R^3$ may exist between silicon atoms, which may be partially dispersed in the molecule.

Examples of the polysilane are polysilanes represented by, for example, the following formulae (II) and (III);

(wherein $R^1$, $R^2$ and $R^3$ are the same as defined above; p, q and s each represent 0 or a positive integer, r represents a positive integer, p, q, r and s are numbers satisfying a, b, c and n in the average formula (I) described above; the numbers show the numbers of the silane units and the number of $R^3$ moieties and do not mean a block copolymer). Each polysilane is crosslinked with the $R^1Si$ unit and, if necessary, $R^3$, and has a network skeleton.

In the above formulae, $R^1$ is a substituted or unsubstituted monovalent hydrocarbon atom bonded to silicon atom of the polysilane. Examples thereof are a linear or branched alkyl group such as methyl, ethyl, propyl, butyl, pentyl, hexyl, octyl, decyl, dodecyl, tetradecyl or octadecyl; a cycloalkyl group such as cyclohexyl; an aralkyl group such as 2-phenylethyl or 2-phenylpropyl; an aryl group such as phenyl, tolyl, xylyl or mesityl; an alkenyl group such as vinyl or allyl; an alkenylaryl group such as p-vinylphenyl; and a substituted hydrocarbon group such as chloromethyl, trifluoropropyl or methoxyphenyl. In these groups, the alkyl group such as methyl, ethyl, propyl, butyl, pentyl, hexyl, octyl, dodecyl or octadecyl is preferred, and methyl, ethyl, propyl, butyl, pentyl or hexyl is more preferred on considering the ease of the polymer synthesis and the reactivity.

$R^2$ is a monovalent hydrocarbon group having from 1 to 12 carbon atoms constituting the hydrocarbyloxy group $OR^2$ bonded to silicon atom, which is the major characteristic of the polysilane used in the present invention. Examples of the group are a linear or branched alkyl group such as methyl, ethyl, propyl, butyl, pentyl, hexyl or dodecyl; a cycloalkyl group such as cyclohexyl; and an aryl group such as phenyl, tolyl, xylyl or mesityl. From the ease of the polymer synthesis and the reactivity, the alkyl group having from 1 to 12 carbon atoms such as methyl, ethyl, propyl, butyl, hexyl or dodecyl is preferred, and methyl and ethyl are more preferred. A lower alkoxy group such as methoxy and ethoxy is most preferred as $OR^2$.

Such a hydrocarbyloxy group may be bonded to any silicon atom disposed at the terminal portion, the intermediate portion, or the branched portion of the polysilane molecular chain. It is preferred for the number b of the hydrocarbyloxy group that the ratio b/(a+b) of b to the number of the total organic groups bonded to the silicon atoms of the polysilane is at least 0.05, from the effect of increasing the optical durability in using the polysilane in an optical device. If the ratio is less than 0.05, the above-described effect is not sufficient.

$R^3$ is a substituted or unsubstituted divalent hydrocarbon group or a heterocyclic group, introduced between the silicon atoms in the polysilane chain, in the form of crosslinking the polysilane chain, or in the network polysilane structure. $R^3$ preferably exists such that it is dispersed in the molecule of the polysilane.

Examples of $R^3$ are an alkylene group such as methylene, ethylene or trimethylene; a divalent aliphatic saturated hydrocarbon group such as butadienylene; an arylene group such as phenylene, naphthylene, biphenylene, 9,10-anthracenylene or ferrocenylene; a divalent hydrocarbon group such as xylylene; and a heterocyclic group such as thienylene. Phenylene, 9,10-anthracenylene, and thienylene are preferred, for ease of the polymer synthesis.

The number c of $R^3$ is preferably $0 \geq c \geq n/5$ from ease of the transfer of the σ electron of the Si-Si bond.

The average molecular weight of the hydrocarbyloxy group-containing polysilane used in the present invention may be optionally selected according to the property of the desired optical device if the polysilane is solid. The weight average molecular weight is preferably from 500 to 3,000,000, and more preferably for 1,000 to 2,000,000, from the workability of forming a film by a coating method such as spin coating.

Such a hydrocarbyloxy group-containing polysilane can be synthesized by various methods. For example, a linear polysilane can be obtained by converting a hydrogen atom of hydropolysilane to an alkoxy group as described in J. P. Banovetz et al, *Journal of American Chemical Society*, 115, 2540(1993). The polysilane can also be obtained by alkoxylating chloropolysilane obtained by the disproportionation reaction of chlorodisilane by conventional methods as described in R. H. Baney et al; *Organometallics*, 2, 859 (1983). The polysilane can further be obtained by a ring-opening polymerization of cyclotetra(dialkoxysilane) as described in Y. Gupta et al, *Polym. Preprents.*, 31, 46(1990).

Utilization of a disproportionation reaction of an alkoxy-disilane makes it possible to synthesize a polysilane with a network skeleton having various organic substituents as described in JP-A-4-311727 (the term "JP-A" as used herein means an "unexamined published Japanese patent application"). Further, it is possible to obtain a polymer having $R^3$ introduced in the silicon chain as described in K. Kabeta et al., Chemistry Letters, 1994, 119.

The literature described above describe alkoxy group-containing polysilanes, and these techniques can be easily applied to other hydrocarbyloxy-containing polysilanes for a person skilled in the art.

The optical device of the present invention is a device obtained by encapsulating the hydroxycarbyloxy group-containing polysilane described above with a material having a light transmitting property and an air-impermeable property, and which shields the interior of the device from the outer atmosphere. Such a material may be inorganic materials or organic materials. Examples of the inorganic material are glasses such as a quartz glass, a synthetic quartz glass or a sodium glass. Examples of the organic materials are polystyrenes, acrylic resins such as polymethyl methacrylate, and polycarbonates having a high transmittance. The material is selected according to the purpose of use of the optical device to be utilized and the wavelength of light used.

The optical device of the present invention is prepared by, for example, the following method.

A solid hydrocarbyloxy group-containing polysilane is introduced into the inside of a package formed of an encapsulant such as a glass or an organic polymer film by, for example, a method of coating the polysilane on the inside of the package as a solution thereof in an organic solvent such as n-hexane, toluene or chloroform, and removing the solvent by drying. Gas and the remaining solvent are then removed from the inside of the package, and the polysilane is encapsulated by reducing the inside pressure to a pressure of $10^{-1}$ Torr or less, and preferably $10^{-2}$ Torr or less, or by replacing the inner atmosphere of the package with argon gas or nitrogen gas (FIG. 1). In this embodiment, coating the polysilane solution may be carried out by a method such as spin coating or immersion.

In another method, a solid hydrocarbyloxy group-containing polysilane may be encapsulated by sandwiching the same between two layers of an encapsulant such as a synthetic resin or a glass, having a high light transmittance (FIG. 2).

In the optical device of the present invention, even when the Si-Si bond activated by light exposure during use is cleaved, active species formed thereby are trapped by Si—$OR^2$, and the number of the Si-Si bonds and the crosslinking density do not change on the whole. Therefore, the durability of the optical device is high.

Accordingly, even when cleavage of the Si-Si bond occurs during use, the polysilane does not convert into siloxane and the molecular weight thereof does not change. As a result, inherent electronic and optical characteristics of the polysilane can be maintained.

In view of those advantages, the optical device of the present invention can be utilized as a non-linear optical material, a light recording material, a light switch, etc. Further, since deterioration of the optical device during use is less, the industrial value of the optical device is large.

The present invention is explained in more detail by the following synthesis examples, examples and comparative examples. However, the invention is not limited by these examples.

In these examples, all parts are by weight unless otherwise indicated.

In addition, the following abbreviations are used for the hydrocarbon groups.

Me: Methyl group
Et: Ethyl group
Hex: Hexyl group
Ph: Phenyl group

SYNTHESIS EXAMPLE 1

Into a flask equipped with a stirrer and a distillation apparatus was charged 0.22 part of 1,2-dimethyl-1,1,2,2,-tetraethoxydisilane under a dry argon gas stream, and 0.5 part of anhydrous diethyl ether solution of 1.14N methyl lithium was added thereto by a syringe. The resulting mixture was stirred at 20° C. for one hour to conduct reaction, whereby a light yellow solution containing catalyst was prepared. At this time, formation of solid matter was not observed. To the solution was added 10.38 parts of 1,2-dimethyl-1,1,2,2-tetraethoxydisilane under a dry argon gas stream, and the resulting mixture was stirred while gradually heating. When stirring was continued for 5 hours by increasing the temperature to 100° C. while distilling off low-boiling matter, a brown liquid product was obtained. During continuing heating, 0.5 part of a distillate was obtained in a receiving vessel of the distillation apparatus. The amount of methyl lithium used in the reaction corresponded to 2 mol % to the sum total amount of the disilane compounds used for the preparation of the catalyst and as the starting material and also corresponded to 0.5 mol % to the ethoxy groups of the disilane compounds.

When the product in the flask was subjected to gas chromatography using SE30 (trade name, made by The General Electric Company Limited) as the stationary phase, it was confirmed that the peak of the disilane compound as the raw material disappeared. The solid matter was removed by suction filtration and the filtrate was slowly added dropwise to absolute ethanol to conduct reprecipitation. The white solid product thus obtained was vacuum dried. The yield of the product was 0.67 part. $^1$HNMR and the IR absorption spectrum were measured for the product. The results obtained are shown below.

It was confirmed by gel permeation chromatography (hereinafter referred to as "GPC") that the weight average molecular weight based on polystyrene standards was 2,800 and the polydispersity (Mw/Mn) was 1.8.

$^1$HNMR(60 MHz, CDCl$_3$, δ): 3.9(m, —OCH$_2$C, 22H), 1.2(br.s, —OCCH$_3$, 33H), 0.4(br.s, Si—Me, 115H);

IR(disk): 2965, 1631, 1270, 1103, 1035 cm$^{-1}$.

The product was dissolved in tetrahydrofuran to form a solution of the 1.0×10$^{-3}$ wt % product. It was confirmed by the measurement of its UV absorption spectra that the product was a polysilane having a network structure. Further, the product was subjected to pyrolysis GC-MS-IR analysis, and it was confirmed that the silane unit ratio (MeSi):(Me$_2$Si):(MeSiOEt) was 19:11:70. For the pyrolysis, a double shot-pyrolyzer Model PY 2010D (trade name, manufactured by Frontier-Lab Co.) was used and the pyrolysis temperature was 500° C.

SYNTHESIS EXAMPLE 2

By following the same procedure as in Synthesis Example 1, 10.6 parts of 1,2-dimethyl-1,1,2,2-tetraethoxydisilane and 0.5 part of methyl lithium were reacted at 100° C. for 200 hours to obtain a white solid polysilane having a weight average molecular weight based on polystyrene standards of 23,800 and a Mw/Mn ratio of 6.3. When the polysilane thus obtained was subjected to pyrolysis GC-MS-IR analysis, the ratio of the silane units (MeSi):(Me$_2$Si):(MeSiOEt) was 26:56:18.

SYNTHESIS EXAMPLE 3

Into a flask equipped with a condenser and Y-form tube was charged 230 parts of 2,5-dibromothiophene under a dry argon gas stream. 13.3 Parts of tetrahydrofran was added thereto, and the resulting mixture was stirred. The mixture was cooled to −78° C. with dry ice-acetone, and 989 parts of a n-hexane solution of 2.5N n-butyl lithium was then added dropwise to the cooled mixture. After confirming disappearance of 2,5-dibromothiophene by gas chromatography, 5,000 parts of 1,2-dimethyl-1,1,2,2,-tetraethoxydisilane was slowly added dropwise to the mixture. Thus, by the reaction of 2,5-dilithiothiophene obtained by lithiating 2,5-dibromothiophene and the disilane compound, lithium ethoxide is produced, and at the same time, a part of the disilane compound is converted to 2,5-bis(1,2-dimethyl-1,1,2-triethoxysilyl)thiophene, thereby obtaining a mixture containing those compounds, unreacted 1,2-dimethyl-1,1,2,2-tetraethoxysilane, and n-hexane, which was a reaction solvent. The mixture was heated at 100° C. for 20 hours as it was to conduct a disproportionation reaction, followed by cooling to room temperature to obtain a reaction product.

When the reaction product in the flask was subjected to gas chromatography using SE30 (trade name, made by The General Electric Company Limited) as the stationary phase, the peak of the disilane compound as the raw material disappeared, and the peak of methylethoxysilane was observed.

When absolute ethanol was slowly added to the reaction product, white precipitates were obtained. Lithium ethoxide was removed by suction filtration, and the solvent and methyltriethoxysilane by-produced were distilled off, thereby obtaining 240 parts of a polymer.

When the polymer obtained was subjected to GPC, the weight average molecular weight thereof was 5,200 (vs polystyrene standards) and the Mw/Mn was 1.9. Further, when the $^1$HNMR of the polymer was measured, the following signals were observed. It was confirmed from the analytical results that the polymer was a thiophene ring-containing polysilane having a network structure, wherein the ratio of (MeSi):(MeSiOEt):(C$_5$H$_2$S) was 83:15:2.

$^1$HNMR(60 MHz, CDCl$_3$, δ): 0.40(br.s, 82H, SiMe), 1.20(m, 7H, SiOEt), 3.50(m, 7H, SiOEt), 7.00–7.70 (m, 1H, —C$_5$H$_2$S—).

SYNTHESIS EXAMPLE 4

To 5.4 parts of phenylsilane was added 0.25 part of dimethylzirconocene as a catalyst, and the resulting mixture was stirred at room temperature for 5 hours. The catalyst was removed by a Florisil column, and low-boiling compounds were distilled off to obtain a light-yellow solid. By subjecting the solid product to GPC, the solid product was confirmed to be poly(phenylhydridosilane) having a weight average molecular weight based on polystyrene standards of 1,900 (Mw/Mn=1.5). The poly(phenylhydridosilane) was refluxed in carbon tetrachloride for 24 hours to convert Si—H bonds in the polysilane to Si—Cl bonds. The polysilane was then reacted with ethanol in the presence of triethylamine to introduce ethoxy groups. As a result, poly (phenylethoxysilane) having a weight average molecular weight based on polystyrene standards of 2,000 (Mw/Mn= 1.1) was obtained.

SYNTHESIS EXAMPLE 5

To 10.0 parts of hexylsilane was added 0.43 part of dimethylzirconocene as a catalyst, and the resulting mixture was stirred at 90° C. for 3 hours. The reaction product thus obtained was extracted with hexane, the catalyst was removed by a Florisil column, and low-boiling compounds were distilled off to obtain a light-yellow solid. By subjecting the solid product to GPC, the solid product was confirmed to be poly(hexylhydridosilane) having a weight average molecular weight based on polystyrene standards of 1,300 (Mw/Mn=1.1). The poly(hexylhydridosilane) was refluxed in carbon tetrachloride for 24 hours to convert Si—H bonds in the polysilane to Si—Cl bonds. The polysilane was then reacted with ethanol in the presence of triethylamine to introduce ethoxy groups. As a result, poly (hexylethoxysilane) having a weight average molecular weight based on polystyrene standards of 1,900 (Mw/Mn= 1.2) was obtained.

SYNTHESIS EXAMPLE 6

To 21.7 parts of dry toluene were added 1.24 parts of metallic sodium and 0.42 part of 18-crown-6, and the resulting mixture was refluxed to dissolve sodium. To the mixture was added dropwise 7.0 parts of dihexyldichlorosilane, and the resulting mixture was refluxed for one hour. The reaction mixture was ice-cooled and 15.8 parts of ethanol was added to the reaction mixture. The reaction mixture was added dropwise to 237 parts of ethanol, and precipitates deposited were collected by a suction filtration. The solids obtained were washed with water and then with ethanol, and extracted with hexane. By distilling off low-boiling compounds, white solid poly (dihexylsilane) having a weight molecular weight based on polystyrene standards of 15,800 (Mw/Mn=1.8) was obtained.

SYNTHESIS EXAMPLE 7

To 43.3 parts of dry toluene were added 1.9 parts of metallic sodium and 0.62 part of 18-crown-6, and the resulting mixture was refluxed to dissolve sodium. To the mixture was added dropwise 5.0 parts of hexyltrichlorosilane, and the resulting mixture was refluxed for one hour. The reaction mixture was ice-cooled and 15.8 parts of ethanol was added thereto. The reaction mixture was added dropwise to 474 parts of ethanol and precipitates deposited were collected by suction filtration. The solids obtained were washed with water and then with ethanol, and extracted with hexane. By distilling off low-boiling compounds, yellow solid poly(hexylsiline) having a weight average molecular weight based on polystyrene standards of 26,000 (Mw/Mn= 4.2) was obtained.

EXAMPLE 1

Into a quartz sample tube was charged 25 parts of the alkoxy group-containing network polysilane having a weight average molecular weight based on polystyrene standards of 2,800 (Mw/Mn=1.8) obtained in Synthesis Example 1 above, and 6.6 parts of dry hexane was added thereto to form a solution. Gases such as oxygen contained in the solution were removed by a freezing degassing method and the solution was irradiated with ultraviolet rays (254 nm) using a low-pressure mercury lamp for 20 minutes. When the ultraviolet absorption spectrum (250 to 400 nm) of the reaction mixture after the irradiation was compared with that of the reaction mixture before the irradiation, the absorption originated from the polysilane was scarcely changed, and by the irradiation a polysilane having a weight average molecular weight based on polystyrene standards of 15,400 (Mw/Mn=3.0) was obtained. As a result, it was confirmed that the molecular weight of the polysilane was increased. The ultraviolet absorption spectral chart of the polysilane before and after the irradiation with ultraviolet ray is shown in FIG. 3.

EXAMPLES 2 TO 5

The irradiation with ultraviolet rays was carried out in the same manner as in Example 1 using each of the alkoxy group-containing polysilanes obtained in Synthesis Examples 2 to 5 above. The weight average molecular weights, the polydispersities, and the ultraviolet absorption spectra at 250 to 400 nm before and after the irradiation with ultraviolet rays were compared.

The results obtained are shown in Table 1 below together with the results obtained in Example 1.

TABLE 1

| Example No. | Poly- silane | Mw (a) | Mw (b) | Mw/Mn (a) | Mw/Mn (b) | UV |
|---|---|---|---|---|---|---|
| 1 | (A) | 2,800 | 15,400 | 1.8 | 3.0 | FIG. 3 |
| 2 | (B) | 23,000 | >100,000 | 6.3 | — | (c) |
| 3 | (C) | 5,200 | 41,000 | 1.9 | 12.3 | " |
| 4 | (D) | 2,000 | 9,800 | 1.1 | 4.9 | " |
| 5 | (E) | 1,900 | 2,000 | 1.2 | 1.2 | " |

(a): Before Irradiation
(b): After Irradiation
UV: Change of UV Spectrum (240 to 400 nm)
(c): Scarcely changed
(A): $(MeSi)_p(Me_2Si)_q(MeSiOEt)_r$
p:q:r = 19:11:70
(B): $(MeSi)_p(Me_2Si)_q(MeSiOEt)_r$
p:q:r = 26:56:18
(C): $(MeSi)_p(MeSiOEt)_r(C_2H_2S)_s$
p:r:s = 83:15:2
(D): $(PhSiOEt)_n$
(E): $(HexSiOEt)_n$ As seen in Table 1, it is clear that the polysilanes containing an alkoxy group are, under the shielded circumstance, stable and do not decrease in molecular weight even by irradiation with ultraviolet light. Accordingly, the polysilanes can be used for optical devices having a high durability.

EXAMPLE 6

The polysilane obtained in Synthesis Example 2 was dissolved in toluene to form a 10% solution of the polysilane. The solution was spin coated on a quartz glass plate for 5 seconds at 500 rpm and then spin coated thereon over a period of 30 seconds at 2,000 rpm. The polysilane thin film having a thickness of 0.4 μm formed was placed in a quartz glass cell together with the quartz glass plate. The interior gas of the cell was replaced with dry argon gas. Under this state, the polysilane thin film was exposed to a low-pressure mercury lamp (1,000 mJ/cm² at 254 nm) and the UV spectra of the polysilane thin film before and after exposure were compared. As a result, it was shown that there was almost no difference between the spectra and the polysilane was stable. When the refractive index of the thin film was measured by ellipsometry, the refractive index n, which was 1.63 before the exposure, was merely changed to 1.62.

Accordingly, it became clear that by using the thin film of the polysilane having an alkoxy group, an optical device having a high durability was obtained.

COMPARATIVE EXAMPLE 1

Into a quartz sample tube was charged 25 parts of the poly(dihexylsilane) having a weight average molecular weight based on polystyrene standards of 15,800 (Mw/Mn=1.8) obtained in Synthesis Example 6 above, and 6.6 parts of anhydrous hexane was added thereto to form a solution. Gases such as oxygen contained in the solution were removed by a freezing degassing method and the solution was irradiated by ultraviolet light (254 nm) using a low-pressure mercury lamp for 20 minutes. When the UV absorption spectrum of the reaction mixture at 250 to 400 nm after irradiation was compared with that before the irradiation, the absorption originated from the polysilane completely disappeared. The ultraviolet absorption spectral charts of the polysilane before and after irradiation are shown in FIG. 4.

COMPARATIVE EXAMPLE 2 TO 4

The poly(hexylsilyne) having a weight molecular weight based on polystyrene standards of 26,000 (Mw/Mn=4.2) obtained in Synthesis Example 7 above was used. That is, in Comparative Example 2, 25 parts of the polysilyne was used, in Comparative Example 3, a mixture 25 parts of the polysilyne and 23 parts of tetraethoxysilane were used, and in Comparative Example 4, a mixture of 25 parts of the polysilyne and 29 parts of 1,2-dimethyl-1,1,2,2-tetraethoxydisilane was used. In each case, the material or the mixture was irradiated with the ultraviolet rays under the same conditions as in Comparative Example 1, and the weight average molecular weights, the polydispersities, and the ultraviolet absorption spectra at 250 to 400 nm before and after the irradiation were compared.

The results obtained are shown in Table 2 together with the results of Comparative Example 1.

TABLE 2

| Comparative Example No. | Poly-silane | Additive | Mw (a) | Mw (b) | Mw/Mn (a) | Mw/Mn (b) | UV |
|---|---|---|---|---|---|---|---|
| 1 | (F) | — | 15,800 | 1,200 | 1.8 | 1.4 | FIG. 4 |
| 2 | (G) | — | 26,000 | 18,900 | 4.2 | 3.0 | (d) |
| 3 | " | (H) | 26,000 | 18,000 | 4.2 | 2.3 | " |
| 4 | " | (I) | 26,000 | 9,300 | 4.2 | 2.1 | " |

UV: Change of UV spectra (250 to 400 nm)
(a): Before Irradiation
(b): After Irradiation
(d): Almost disappeared
(F): (Hex₂Si)ₙ
(G): (HexSi)ₙ
(H): Si(OEt)₄
(I): Me(EtO)₂SiSi(OEt)₂Me The polysilanes used in Comparative Examples 1 to 4 each do not substantially contain an alkoxy group bonded to the silicon atom. From the results shown in the Table above, it can be seen that such a polysilane greatly decreases its molecular weight by the irradiation with ultraviolet rays.

While the invention has been described in detail and with reference to specific embodiments thereof, it will be apparent to one skilled in the art that various changes and modifications can be made therein without departing from the spirit and scope thereof.

What is claimed is:

1. A polysilane optical device comprising a hydrocarbyloxy group-containing polysilane encapsulated with a light transmitting and air-impermeable material, wherein the hydrocarbyloxy group-containing polysilane is represented by following average formula (I);

$$[Si(R^1)_a(OR^2)_bL_n(R^3)_c] \qquad (I)$$

wherein R¹s, which may be the same or different, each represent a substituted or unsubstituted monovalent hydrocarbon group bonded to silicon atom; R² represents a monovalent hydrocarbon group having from 1 to 12 carbon atoms bonded to silicon atom via oxygen atom; R³ represents a divalent substituted or unsubstituted hydrocarbon group or a substituted or unsubstituted heterocyclic group bonded to two silicon atoms; a and c each represent 0 or a positive number, b represents a positive number, provided that b/(a+b)≧0.05 and n≧5c; and n is a number selected such that a weight average molecular weight of the polysilane is from 500 to 3,000,000.

2. The polysilane optical device of claim 1, wherein the material used for encapsulation is a glass, a polystyrene, an acryl resin or a polycarbonate.

3. The polysilane optical device of claim 1, wherein R² is an alkyl group having from 1 to 12 carbon atoms.